United States Patent
Li et al.

(10) Patent No.: US 12,190,539 B2
(45) Date of Patent: Jan. 7, 2025

(54) SYSTEM AND METHOD FOR TRACKING AN OBJECT

(71) Applicant: CENTRE FOR INTELLIGENT MULTIDIMENSIONAL DATA ANALYSIS LIMITED, Hong Kong (CN)

(72) Inventors: Muyu Li, Hong Kong (CN); Hong Yan, Hong Kong (CN)

(73) Assignee: CENTRE FOR INTELLIGENT MULTIDIMENSIONAL DATA ANALYSIS LIMITED, Hong Kong (CN)

(*) Notice: Subject to any disclaimer, the term of this patent is extended or adjusted under 35 U.S.C. 154(b) by 656 days.

(21) Appl. No.: 17/506,844

(22) Filed: Oct. 21, 2021

(65) Prior Publication Data

US 2023/0126351 A1  Apr. 27, 2023

(51) Int. Cl.
  *G06T 7/73* (2017.01)
  *G06T 7/194* (2017.01)
  *G06T 7/246* (2017.01)
  *G06T 7/277* (2017.01)

(52) U.S. Cl.
  CPC .............. *G06T 7/74* (2017.01); *G06T 7/194* (2017.01); *G06T 7/248* (2017.01); *G06T 7/277* (2017.01); *G06T 2207/30224* (2013.01); *G06T 2207/30241* (2013.01)

(58) Field of Classification Search
  CPC  G06T 7/74; G06T 7/194; G06T 7/248; G06T 7/277
  See application file for complete search history.

(56) References Cited

U.S. PATENT DOCUMENTS

| | | | |
|---|---|---|---|
| 8,270,711 B2* | 9/2012 | Afzulpurkar | G06T 7/12 382/209 |
| 2003/0002740 A1* | 1/2003 | Melikian | G06T 7/74 382/291 |
| 2021/0158536 A1* | 5/2021 | Li | G06V 20/46 |

FOREIGN PATENT DOCUMENTS

WO  WO2020062279  * 4/2020  ............... G06T 7/20

* cited by examiner

*Primary Examiner* — Myron Wyche
(74) *Attorney, Agent, or Firm* — MOSER TABOADA

(57) ABSTRACT

A system and method for tracking an object comprising: an image input gateway arranged to receive a series of image frames from a stream of images, wherein the stream of images includes representations of the object being spatially displaced over the series of image frames; an object tracker arranged to process the series of image frames to track the object with a first object location process arranged to locate the object in the series of image frames; and, when upon the object is unable to be located by the first object location process in any of the image frames within the series of image frames, use a second object location process to locate the object in the image frames or subsequent image frames for tracking the object through the remaining series of image frames.

17 Claims, 7 Drawing Sheets

SYSTEM AND METHOD FOR TRACKING AN OBJECT

TECHNICAL FIELD

The present invention relates to a system and method for tracking an object, and particularly, although not exclusively, to a system and method for tracking a hockey puck as it is manipulated by players via captured videos of the hockey game.

BACKGROUND

Sports games often involve the interaction and manipulation of a ball or puck to meet a particular goal. As in the case of hockey, a puck is generally used as part of the game play in which players must try to deliver the puck into a goal to score points. Naturally, in this process, players may attack, defend, or lead with the puck over the course of the game in order to either win points or to prevent the opposing team from scoring any points.

Audience watching such games are generally focused on the ball or puck, as this is where much of the action is likely to be located in a game. A live audience are likely to focus on the action of the game by looking for the puck or action amongst the players. However, audiences that are watching this on a broadcast may have to rely on the skills of the camera operator who would focus on the action or the puck of the game.

It would be desirable to be able to automate this process such that broadcasters are able to reduce their costs in capturing or broadcasting a game. Furthermore, if a puck can be tracked, then gaming statistics may also be devised to improve the quality of information provided to the audience or game operators. However, attempts at tracking a puck is a difficult process due to the characteristics of a hockey puck, the manner in which players interact with the puck and the speed in which the puck is generally delivered during a game.

SUMMARY OF THE PRESENT INVENTION

In accordance with a first aspect, there is provided a system for tracking an object comprising:
  a image input gateway arranged to receive a series of image frames from a stream of images, wherein the stream of images includes representations of the object being spatially displaced over the series of image frames;
  a object tracker arranged to process the series of image frames to track the object with a first object location process arranged to locate the object in the series of image frames; and, when upon the object is unable to be located by the first object location process in any of the image frames within the series of image frames, use a second object location process to locate the object in the image frames or subsequent image frames for tracking the object through the remaining series of image frames.

In an embodiment of the first aspect, wherein the first object location process locates the object in the series of image frames by applying a filter to each of the image frames, wherein the filter is initialized based on a confirmed image portion of the object.

In an embodiment of the first aspect, wherein the confirmed image portion of the object is retrieved from an initial image frame of the series of image frames, representative of a known position of the object before the object is spatially displaced.

In an embodiment of the first aspect, wherein the first object location process further includes a shape comparator arranged to compare at least one candidate object image portion selected by the filter, with a template of an object arranged to represent a shape of the object.

In an embodiment of the first aspect, wherein the template of the object is determined by the confirmed image portion of the object.

In an embodiment of the first aspect, wherein the filter includes a correlation filter.

In an embodiment of the first aspect, wherein the correlation filter and the shape comparator each produces a result score, the result score is processed to determine if the first object location process is able to locate the object in the series of image frames.

In an embodiment of the first aspect, wherein the second object location process includes a controlled movement tracking process and a free movement tracking process arranged to track the object.

In an embodiment of the first aspect, wherein the controlled movement tracking process includes:
  a shape detection routine arranged to performing a shape detection to identify if one or more candidate object image portions within the image frames are of a similar shape to the object; and
  an object comparator arranged to compare each of the templates with the one or more candidate objects to identify the object from the one or more candidate object image portions.

In an embodiment of the first aspect, wherein the comparator is further arranged to use a Hu Moment method.

In an embodiment of the first aspect, wherein the controlled movement tracking process further includes a background segmentation process arranged to segment occlusion objects from the background to form occlusion object segment and a background segment, and where the one or more candidate objects are also determined to be within the occlusion objects segment or background segment, and if the one or more candidate objects are inside the occlusion objects segment, then the one or more candidate objects are deemed not to be the object.

In an embodiment of the first aspect, wherein the background segmentation process includes a ray casting routine arranged to segment the occlusion objects from the background.

In an embodiment of the first aspect, wherein the free movement tracking process includes:
  an edge detection process arranged to locate the object against the background; and,
  a filter routine arranged to predict a trajectory of the object.

In an embodiment of the first aspect, wherein the filter routine uses a Kalman estimator.

In an embodiment of the first aspect, wherein the movement tracking process further includes using a correlation filter to locate the object.

In accordance with a second aspect of the invention, there is provided a method for tracking an object comprising the steps of:
  receiving a series of image frames from a stream of images, wherein the stream of images includes representations of the object being spatially displaced over the series of image frames;

processing the series of image frames to track the object with a first object location process arranged to locate the object in the series of image frames; and, when upon the object is unable to be located by the first object location process in any of the image frames within the series of image frames, use a second object location process to locate the object in the image frames or subsequent image frames for tracking the object through the remaining series of image frames.

In an embodiment of the second aspect, wherein the second object location process includes a controlled movement tracking process and a free movement tracking process arranged to track the object.

In an embodiment of the second aspect, wherein the controlled movement tracking process includes:
  a shape detection routine arranged to performing a shape detection to identify if one or more candidate object image portions within the image frames are of a similar shape to the object; and
  an object comparator arranged to compare each of the templates with the one or more candidate objects to identify the object from the one or more candidate object image portions.

In an embodiment of the second aspect, wherein the comparator is further arranged to use a Hu Moment method.

In an embodiment of the second aspect, wherein the free movement tracking process includes:
  an edge detection process arranged to locate the object against the background; and,
  a filter routine arranged to predict a trajectory of the object.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
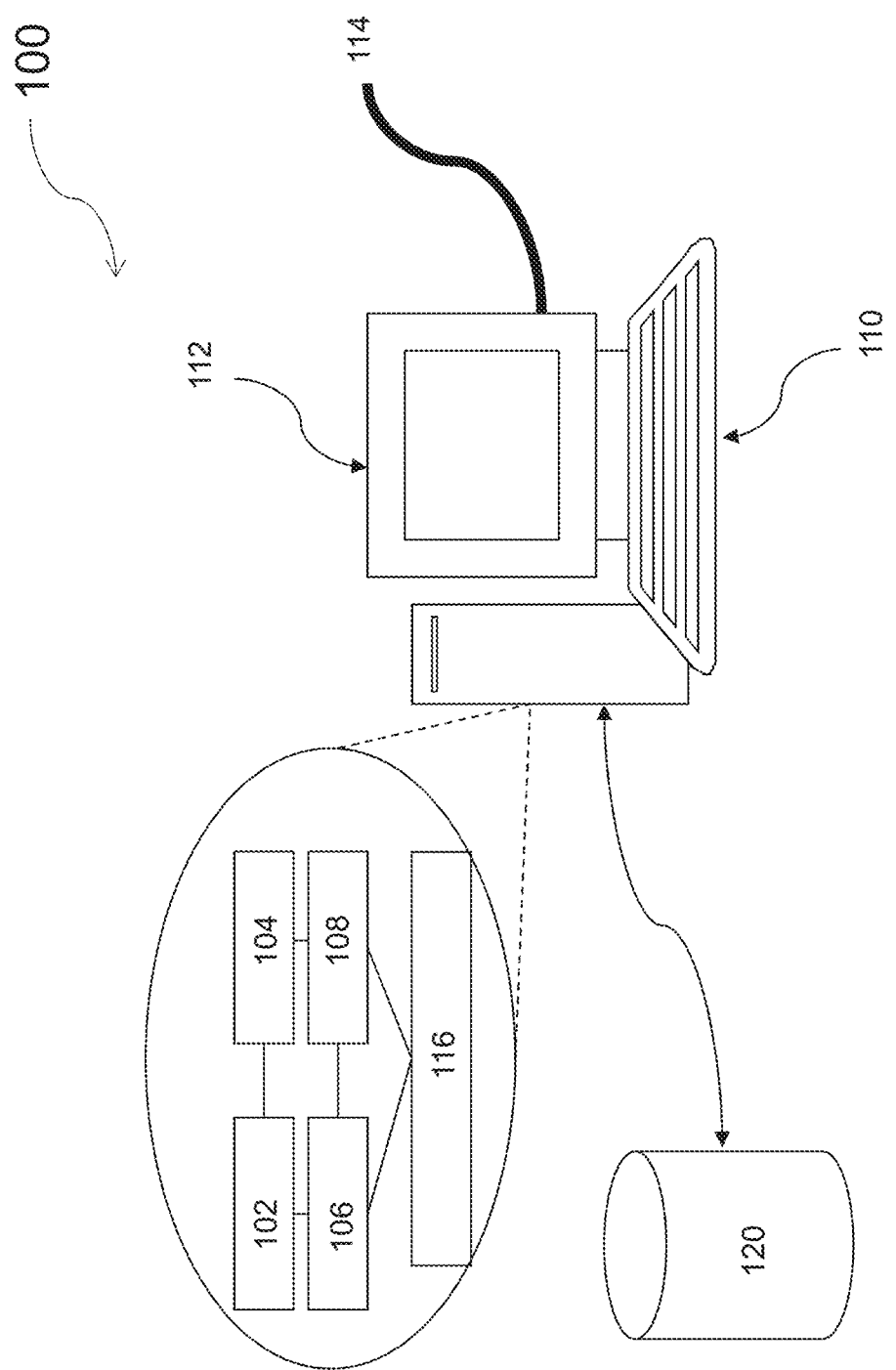
FIG. 1 is a schematic block diagram of a computer or computing system which may be implemented to operate as a system for tracking an object in accordance with one embodiment of the present invention.

Referring to FIG. 1, there is provided a schematic diagram of a computer or computing system which may be implemented to operate as a system for tracking an object comprising:

an image input gateway arranged to receive a series of image frames from a stream of images, wherein the stream of images includes representations of the object being spatially displaced over the series of image frames;

an object tracker arranged to process the series of image frames to track the object with a first object location process arranged to locate the object in the series of image frames; and, when upon the object is unable to be located by the first object location process in any of the image frames within the series of image frames, use a second object location process to locate the object in the image frames or subsequent image frames for tracking the object through the remaining series of image frames.

As shown in FIG. 1, the computer or computing device 100 may be any computer or computing apparatus with an appropriate user interface. The computer 100 may be implemented by any computing architecture, including stand-alone PC, client/server architecture, "dumb" terminal/mainframe architecture, smart device architecture, portable computers, tablet computers, wearable devices, Internet of things (IOT) devices, cloud-based servers or any other appropriate architecture. The computing device may also be appropriately programmed to implement the invention.

The computer 100 may comprise suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The computer 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, remote storage devices, wireless or handheld computing devices. At least one of a plurality of communications link 114 may be connected to an external computing network through a telephone line or other type of communications link.

The computer may include storage devices such as a disk drive 108 which may encompass solid state drives, hard disk drives, optical drives, magnetic tape drives or remote storage services such as a cloud-based servers 120. The computer 100 may also use a single disk drive or multiple disk drives. The computer 100 may also have a suitable operating system 116 which resides on the disk drive or in the ROM of the computer 100.

Figure 2:
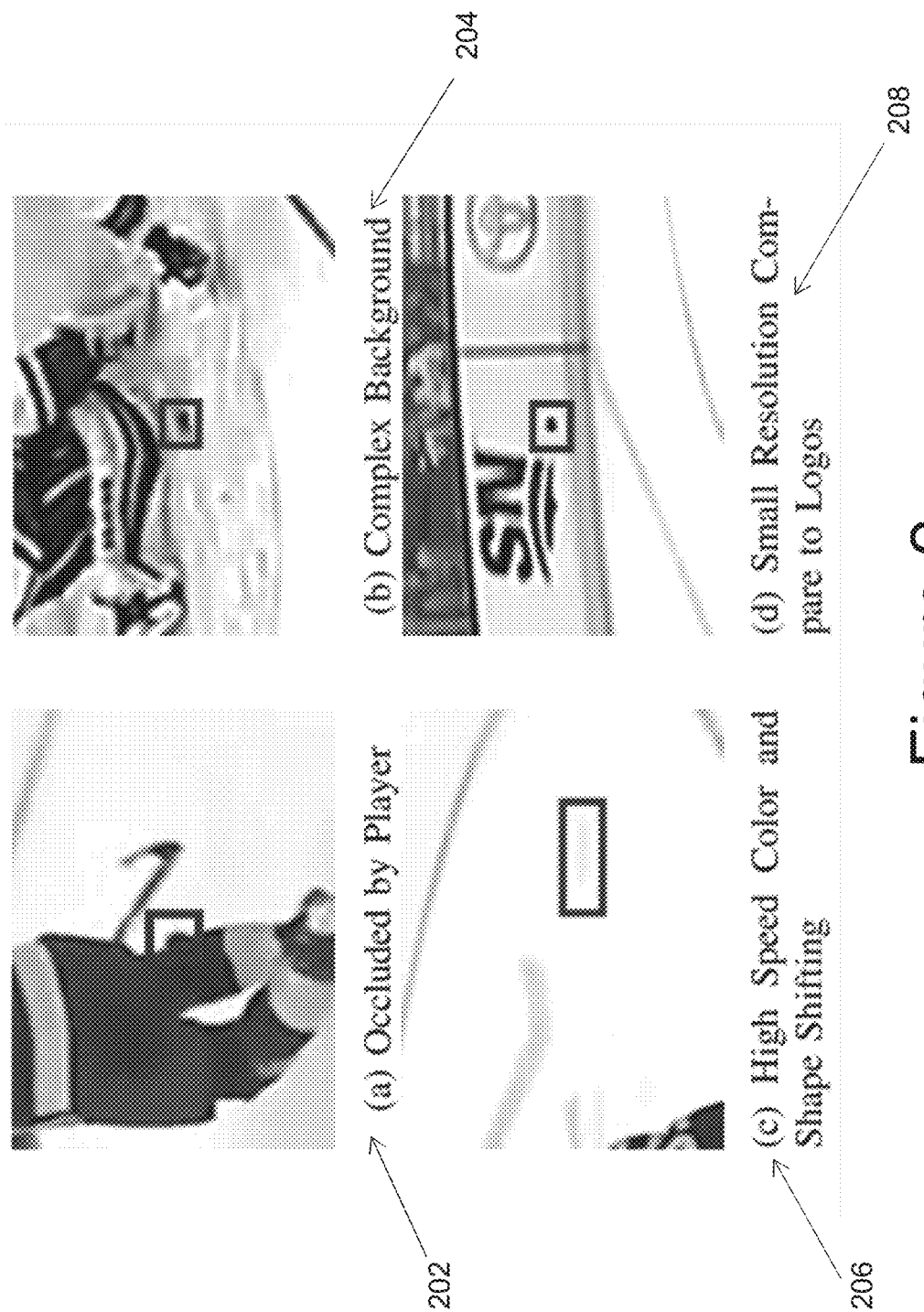
FIG. 2 is a plurality of images illustrating examples of image frame portions cropped from a stream of images (such as a video) that show examples of challenging puck locations, background complexities or player/object occlusions in processing such image frames for tracking a hockey puck.

As shown in FIG. 1, the system for tracking an object may be implemented on a computer 100 to process captured videos in the form of a series of image frames so as to track a sport or game related object that may be manipulated during game play. The object may be displaced spatially around a predefined space or area such as a table, field, court or rink. Preferably, embodiments of the system for tracking an object may be arranged to track ice-hockey pucks which are generally manipulated by players with hockey sticks on an ice-skating rink during game play, although other sports, games or activities may also be applicable. Embodiments of the system for tracking an object may be specifically optimized for the physical characteristics of ice hockey game play as the puck is generally subject to manipulation by a plurality of players with hockey sticks, or that the puck may be struck by a hockey stick which will in turn cause the puck to travel at high speeds over a defined spatial area. These characteristics of the game of ice hockey presents a number of unique observations which had been considered by the inventors in their research, trials and experimentations in devising the embodiments of the system for tracking an object. Such observations, as presented in FIG. 2, include:

- Relative small size of the hockey puck, and thus in turn, its possible obstruction or occlusion 202 during game play by players, hockey sticks or referees;
- Shape of puck 204 may be similar, when captured on a video, to those of other circular or ellipsoid objects such as court markets, player markings, advertisements, artworks or text 208 in the surroundings or backgrounds;
- Relative highspeed of travel by the puck when it is struck by a player, and the shape and/or color of the puck as captured by video sources may change 206 due to the high speed in which the puck is moving.

These physical characteristics as observed may be unique to ice hockey, hockey or similar games and thus examples of the system for tracking an object may be specifically optimized for tracking a hockey puck in a game of ice hockey. However, other games, sports or activities may also offer similar types of characteristics. Sports such as lacrosse, grass hockey, roller-blade hockey, or games such as air hockey may also experience similar characteristics, and thus the system for tracking an object may also be used or otherwise adapted to operate with these other sports, games or activities.

Figure 3:
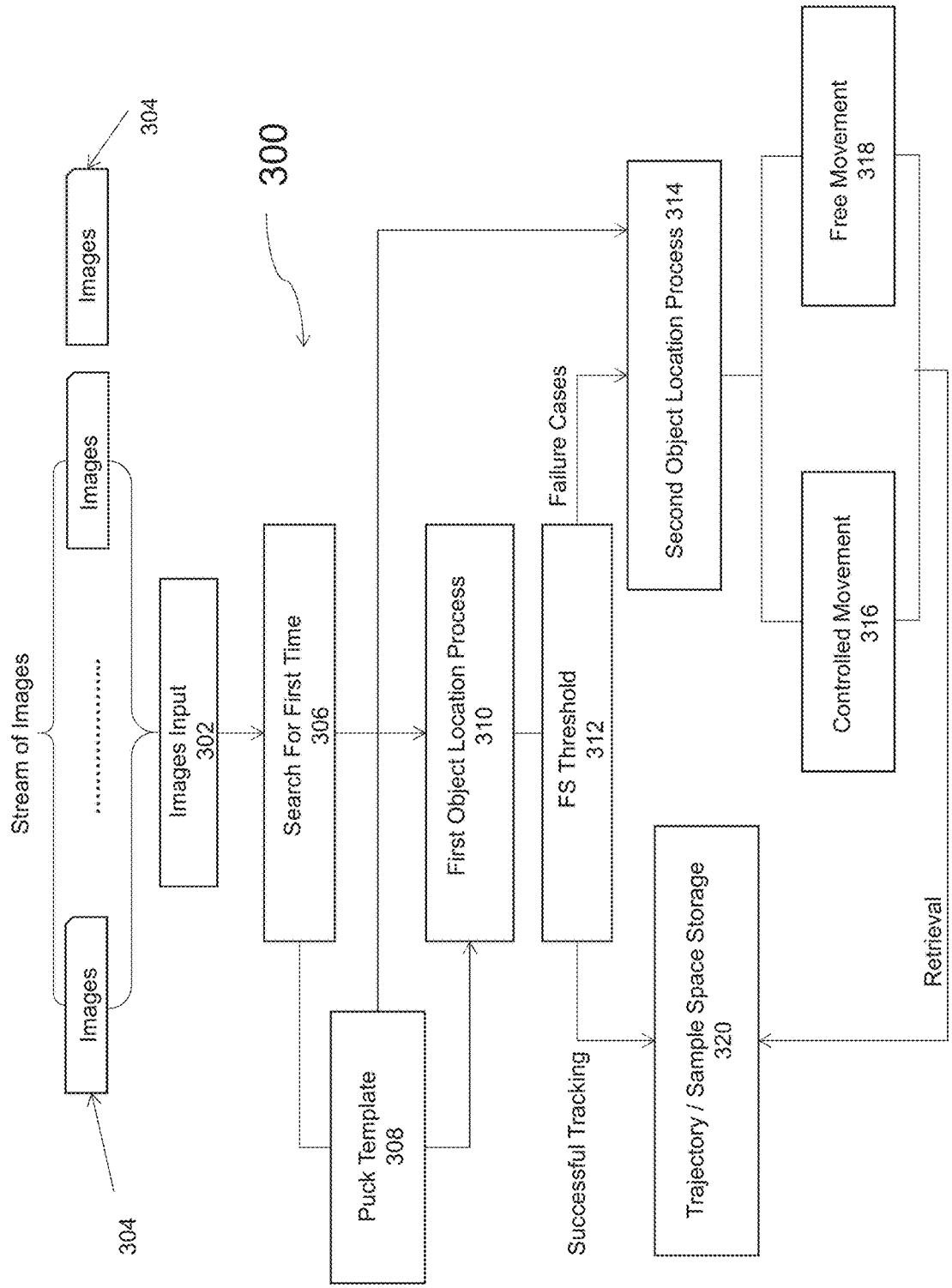
FIG. 3 is a block diagram illustrating the components and flow of data between the components of an example embodiment of a system and method for tracking an object.

With reference to FIG. 3, there is illustrated a block diagram of an embodiment of a system for tracking an object 300. In this example embodiment, the system 300 includes a images input 302 which is arranged to receive a series of image frames, that together may come from a stream of images 304 as captured by a camera of an ice-hockey (or other suitable sport) game. It is generally assumed that such a stream of images 304 may be a television broadcast of a hockey game and thus the series of images 304 captured will include the space in which the hockey game is played (e.g. the rink, court or field), and that the puck, which is manipulated by players, will be captured in at least some of the series of image frames 304. As expected of any video capture of any sports game, the camera operator may zoom in or out, or move the camera as required to capture the game for a human audience, and such operation by a camera operator have been considered by the inventors in their experimentation and implementation of this embodiment of the system for tracking an object 300.

Once the image frames 304 are inputted to the system 300, an initialization frame is firstly collected 306. This initialization frame is useful to capture the shape of a puck or to train a filter for the subsequent training of the tracking processes. Accordingly, as with most games, the puck may be placed near the centre of rink when the game is about the start, which allows the puck to be cropped from the first image frames for training the filter or to generate a puck template 308. This template 308 may then be used by other tracking processes later for matching which of the possible puck candidates are likely to be the puck or other objects captured within an image. After this process is completed, a first object location process 310 is initiated to track the puck in the series of image frames as it is manipulated by players during the game.

Preferable, the first object location process 310 is arranged to track the puck in the series of image frames 304. This process 310 may include the use of a filter, such as a correlation filter, to locate and track the puck location within each image frame. This information is useful as the location of the puck within the image frames 304 may be stored for subsequent usage, such as game scores or statistic calculations, or in the event of a live game, such information may be used to direct or operate a camera such that the puck may be continually tracked and captured by the camera.

In this example, as it is shown in FIG. 3, for each image frame 304, which will have an individual time stamps, a cropped search area suggested from previous location of the puck may be fed into the first object location process 310. The first object location process may then proceed to process the image and determine whether the puck can be detected. This process, which will be explained in detail below, may determine a Failure Score (FS) 312 that combines the scores from the correlation filter with structural similarities of a puck candidate that may also be determined by comparing the image crop of the puck candidate with a known puck image or puck template 308. This combination of scores in turn may allow the tracking process by the first object location process 310 to determine if it has successfully tracked the puck (by locating it confidently) or if it had failed to locate the puck in the search area.

Figure 4A:
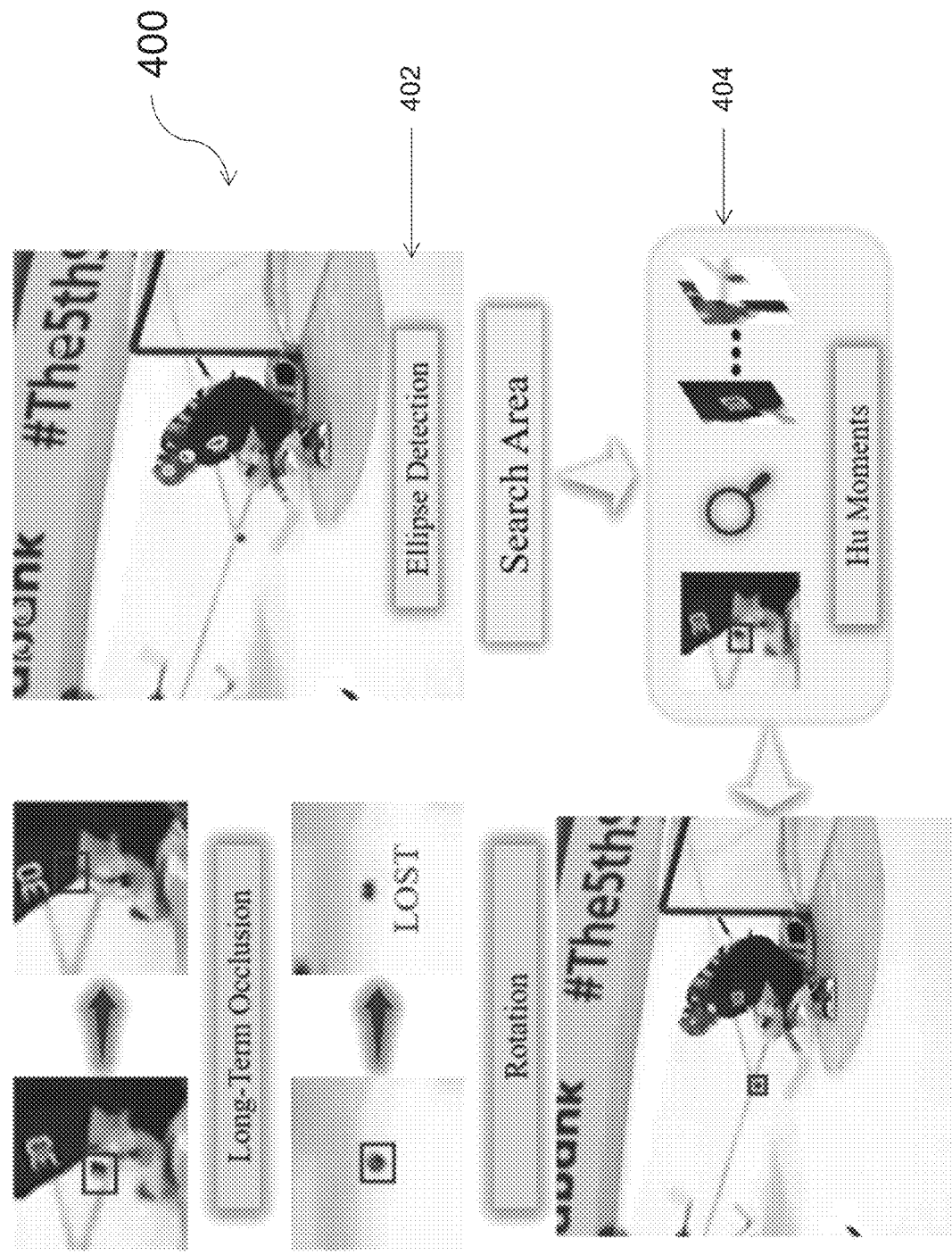
FIG. 4A is a block diagram illustrating the data flow of a second object location process for tracking a puck when the puck is in a controlled moving (CM) state.
Figure 4B:
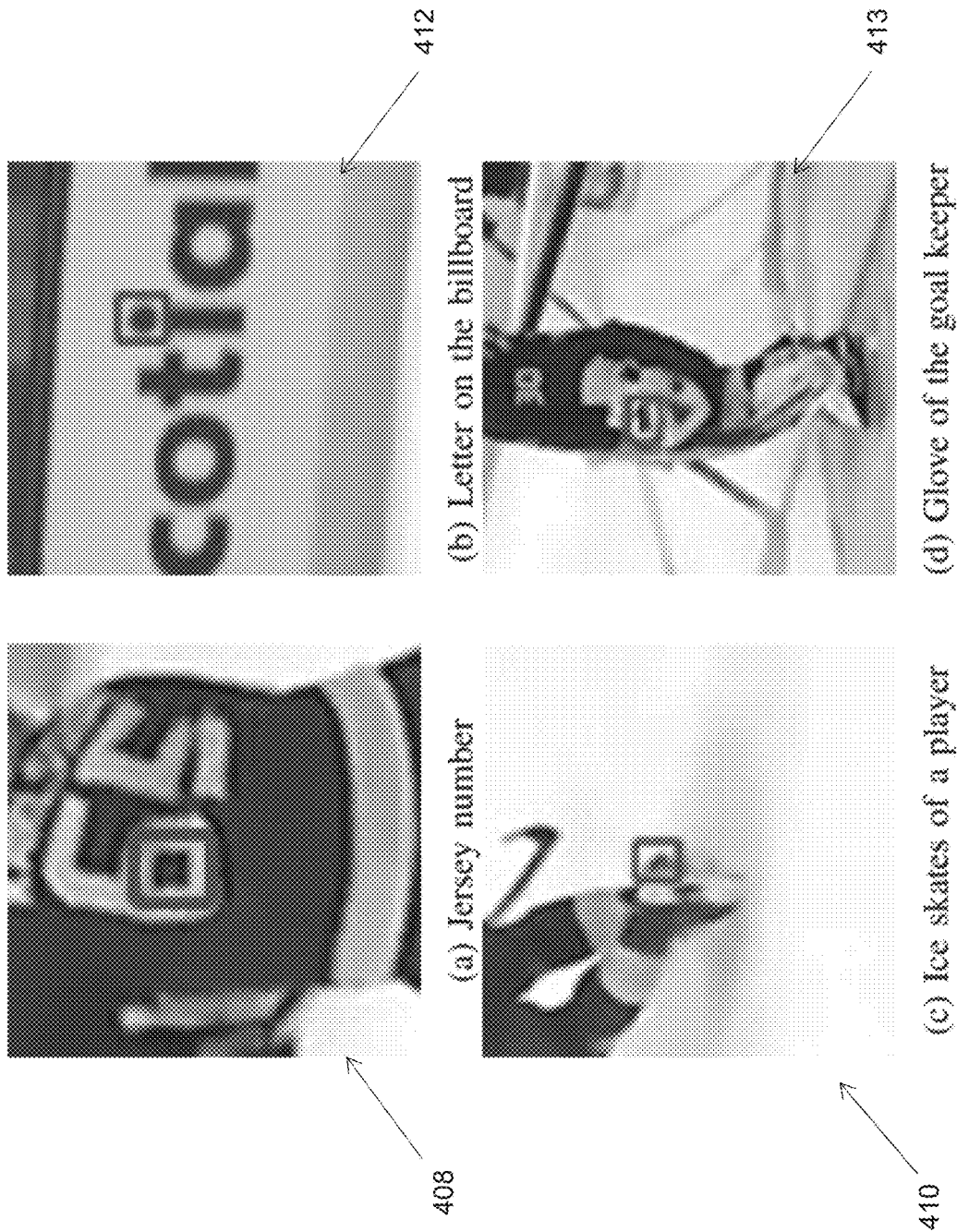
FIG. 4B are images illustrated example occlusions or background complexities that may affect the process in tracking the puck by the second object location process of FIG. 4A.

It follows that if there is a failure, as determined by the failure score meeting a predetermined threshold, then a second object location process 314 is initiated to locate the puck from the image, or any subsequent images within the series. The second object location process 314 includes two routines to locate the puck from the images which may operate in series or in parallel. The two routines 316 and 318, further described below with reference to FIGS. 4A to 5, are each arranged to locate the puck within each image with specific procedures that are suited to either the puck being in a controlled moving state (CM) or whether the puck is in a free moving state (FM). These two states represent the possible motion of the puck during a hockey game, and based on the unique circumstances of each state, a separate process implemented to operate with each of the unique circumstances of each state is used to locate and track the puck on each of these states. Examples of the second object location process 314 is further described with below with reference to FIGS. 4A to 5.

In this embodiment, the system for tracking an object 300 is able to perform puck detection whilst also having a tracking approach that targets the two states CM and FM as mentioned above. Accordingly, embodiments may be advantageous in that it is able to deal with problems like shape-changing of the puck and occlusion of the puck during the hockey game. In turn, allow for superior and more accurate tracking the puck when compared with other tracking techniques.

Preferably, as it will be explained below with respect to FIGS. 3 to 5, the whole tracking process consists of two tracking processes, a first tracking process performed by a first object location process 310 to track the puck at a slow speed without heavy interference and a second object location process 314 which will perform a re-identification process or re-ID phase to target extreme circumstances (e.g. when the puck is unable to be tracked due to interference, occlusion or complex backgrounds) corresponding to the controlled moment (CM) and free movement (FM) state.

In these examples of the first location processes 310 the steps in locating the puck may consider that the color of official pucks is black and the ice surface is mainly white. Accordingly, adopting a color name (CN) feature as described in J. Van De Weijer, C. Schmid, J. Verbeek, and D. Larlus, "Learning color names for real-world applications,"

IEEE Transactions on Image Processing, vol. 18, no. 7, pp. 1512-1523, 2009 and combining this with Histogram of Gradients (HoG) as described in N. Dalal and B. Triggs, "Histograms of oriented gradients for human detection," in 2005 IEEE computer society conference on computer vision and pattern recognition (CVPR'05), vol. 1. Ieee, 2005, pp. 886-893. may be used to create a main feature map for the first object location process 310. With the constant change of the shape, the structure features may also be brought into the picture as well.

In this example embodiment, the first location processes 310 is arranged to track the puck whilst it is travelling at a relatively slow speed without heavy environmental interference. In this regard, the first location processes 310 may be operating as a single object tracking problem. Considering the need of real-time processing on video and lack appearance features of pucks, a first correlation filter is selected as this is advantageous in simplicity and reduction in computational complexity.

From the first image frame of the stream of images 304, usually at the start of the game, the puck is likely to be located at the center of the image. Based on this assumption, the first image frame in an example implementation of the system for tracking an object, the frame is set with a threshold with an initial gray-level threshold $\alpha_{init}$, which is the normalized threshold value of $0.55 \cdot \alpha_{init}$ and is a statistical value acquired from an analysis of the first frames in a group of public available online ice hockey match videos.

In accordance with experiments and trials as performed by the inventors, it was found that by using a threshold of $\alpha_{init}$ the separation between the puck and the rink is robust even with the different environmental settings such as logos on the ice or different illumination in the rink. Preferably, the correlation filter may also be initialized using the carefully cropped image patch containing the puck. This tracking phase as performed by the first object location process 310 may then following by a regular correlation filter tracker procedure as ECO tracker as described in M. Danelljan, G. Bhat, F. Shahbaz Khan, and M. Felsberg, "Eco: Efficient convolution operators for tracking," in Proceedings of the IEEE conference on computer vision and pattern recognition, 2017, pp. 6638-6646.

In this example, the process 310 may discriminatively learn a correlation filter based on a collection of K training samples $\{x_k\}_1^K \sqsubset \chi$ from previous tracking results, and each feature layer $f_k^m \in \mathbb{R}^{Res_m}$ has an independent resolution $Res_m^1$. Specifically, in this example 8] and CN (Color Names) feature maps has been demonstrated in experiments as yielding little difference in performance compared with deep features extracted by Convolution Neural Networks (CNN), but operating at a much higher speed, and therefore offers an advantage in processing speed and lack of computational complexities when compared with a CNN. This is because the puck in an image frame does not hold rich texture or semantic information which in turn allows color and edge features of the puck play the most important role in the feature space.

The learning process may therefore be qualified by the following steps, and perform an update of the puck's location.

First, the feature map is transferred into the continuous spatial domain $t \in [0, T\}$ by an interpolation model, with the operator $J_m$, $$J_m\{x^m\}(t) = \sum_{res=0}^{Res_m-1} x^m[r]b_m\left(t - \frac{T}{Res_m}r\right)$$

Here $b_\alpha$ is an interpolation kernel with period of T>0 R denotes the independent resolution of feature layer A Then, the entire interpolated feature map J{f} is formed by combined all the interpolated feature layer $J_\alpha\{f^\alpha\}$. A factorized convolution operator is introduced to predict the detection scores $S_{det}$ of the puck as:

$$S_{det,P,f}\{f\} = Pf * J\{x\}$$
$$= \sum_{n,m} p_{m,n} f^n * J_m\{x^m\}$$
$$= f * P^T J\{x\}$$

The scores $S_{det}$ show the confident of the puck's location in each corresponding image region of the feature map $x \in \chi$. Where P is a M×N matrix which represents the coefficient space. $f^n$ is a smaller set of basis filters ($f^1, \ldots, f^m$) instead of learning one separate filter for each feature channel m. f is constructed as a linear combination of the filter $f^n$ by a set of learned coefficients $p_{m,n}$. This process may in turn be viewed as a lower dimensional method leads to a radical reduction of parameters. The filters are learned by minimizing the L2norm in Fourier domain to form a more tractable optimization problem as follows, $$E(f, P) = \|\hat{z}^T P \hat{f} - \hat{y}\|_{l^2}^2 + \sum_{n=1}^{N} \|\hat{w} * \hat{f}_n\|_{l^2}^2 + \lambda \|P\|_F^2$$

Where $\hat{y}_j$ is the Fourier coefficients of labeled detection scores of samples $x_k$, which is originally set to a periodically repeated Gaussian function. $z^{\hat{m}} = X^m b_m$ is used to simplify notation as the Fourier coefficients of the interpolated feature map $z = J\{x\}$.

The regularization integrates a spatial penalty to mitigate the drawbacks of the periodic assumption, while enabling an extended spatial support. The loss is a nonlinear least squares problem, thus employ Gauss-Newton as described in J. Nocedal and S. Wright, Numerical optimization. Springer Science & Business Media, 2006 and using the Conjugate Gradient method to optimize it and complete the learning process of tracking. Having the above processes, the tracker is able to perform an update stage in a search area with 1.5 times size of the original image patch. With no catastrophic interference such as occlusion or out-of-view problem, the plain tracking phase maintains an acceptable robust performance Traditional correlation filter tracker like KCF, DCF, C-COT as described in J. F. Henriques, R. Caseiro, P. Martins, and J. Batista, "High-speed tracking with kernelized correlation filters," IEEE transactions on pattern analysis and machine intelligence, vol. 37, no. 3, pp. 583-596, 2014, or ECO focus on single object tracking where the tracking scenario has an obvious distinction between foreground and background, and are only able to retrieve object after short-term occlusion or lost. Under this premise, trackers tend to fail when a similar object or occlusion occurs. This problem is particularly fatal in the task of tracking hockey pucks due to the low-texture of the puck in the image. Other objects in the neighbourhood, such as the end of sticks waving by players, may share the similar color and contour, which is possible to confuse the tracker and cause failure or drift.

In order to tackle this concern, a modified update strategy may also be preferably implemented. Instead of updating on the region with highest score, another shape similarity score on binary image is introduced to balance the influence of other similar objects. An image patch from the first frame is served as a template 308 to calculate shape similarity between the location predicted by correlation filter and itself. The shape similarity score is measured by Hu-Moment Invariants M.-K. Hu, "Visual pattern recognition by moment invariants," IRE transactions on information theory, vol. 8, no. 2, pp. 179-187, 1962, which include a set of 7 numbers calculated by central moments that are invariant to image transformations. Central moments using in Hu-Moment invariants are calculated as follows:

$$\eta_{pq} = \sum_x \sum_y (x-\bar{x})^p (y-\bar{y})^q I(x, y)$$

Where centroid $(\bar{x}, \bar{y})$ can be acquired by $$\bar{x} = \frac{M_{10}}{M_{00}}, \bar{y} = \frac{M_{01}}{M_{00}},$$

and $M_{00}$, $M_{01}$, $M_{10}$ are moments calculated by formula $M_{ij}=\Sigma\Sigma x^i y^j I(x, y)$. Then it is possible to measure 7 Hu-Moment Invariants using centroid moments.

Preferably, by adopting the first 6 moments to compare the shape similarity, since they have been proved to be invariant to translation, scale, and rotation, and reflection. By measuring 6 Hu-Moment Invariants, the similarity score $S_{ss}$ is calculated using L1distance as follows:

$$S_{ss} = \sum_{i=0}^{6} |H_i^{template} - H_i^{CF}|$$

After getting the shape similarity score between the template and the image patch given by correlation filter, a failure score (FS) 312 combined with weighted correlation filter and shape similarity is introduced as follows:

$$FS(s_{cf}, s_{ss}) = \frac{1}{1 + e^{(s_{cf} - \delta_{cf})\gamma_{cf}}} \times \frac{1}{1 + e^{-(s_{ss} - \delta_{ss})\gamma_{ss}}}$$

Where FS 312 is weighted constraint combined with shape similarity score and the max confident score of correlation filter result. A transformation of sigmoid function is used to smooth the threshold of each score and filter the score further away from the threshold. $\delta_{cf}=0.2$, $\delta_{ss}=0.4$ denote the empirical parameter to determine whether the result from correlation filter or shape similarity measure is valid or not, respectively.

To deal with extreme cases when either correlation filter or shape similarity measure returns a confident feedback while the other measurement disagrees, a hard gap of $\delta_{cf}<0.1$, $\delta_{ss}>0.7$ are set for both thresholds. $\gamma_{cf}$, $\gamma_{ss}$ are the amplify factor to weight the influence of correlation filter and shape similarity respectively. The higher the Failure Score 312 (FS) means the tracking process as performed by the first object location process 310 is likely failed. Any result with the score above 0.8 indicates that the object is whether being occluded or hit by a player with a changed shape. For the puck under this circumstance, the correlation filter stops updating or adding patches to the memory, saves the previous samples and hands it over to the second object location process 314 for the re-identification phase for further processing.

As shown in FIGS. 3 and 4, the Re-identification phase is handled by the second object location process 314. The process 314 includes routines which would handle both a controlled moving state (CM) 316 and free movement state (FM) 318 of the puck. Both the handling of the puck in CM or FM state may be performed in series or be performed in parallel with the results in either one or both routines 316, 318 being successful in locating the puck given the state in which the puck may be in.

To tackle the problem of occlusion and some difficult cases of rotation, the process 314 would firstly adopt ellipse detection to find objects with the shape similar to the puck. Then calculate Hu Moments between previous confirmed puck and the detected objects. Following this, a selection is made based on the best match as the final retrieval result.

During experimentations as performed by the inventors, with the second object location process 314, when the re-identification or (Re-ID) phase is required, directly using popular single object tracker like correlation filter tracker may easily fail and lead to problems like drift or lost. This kind of failure tends to appear regularly even after weighting by a combined constraint of shape similarity. When the correlation filter cannot find a reliable result of the puck in certain frame, a re-identification phase is proposed to handle puck retrieving task, under both CM state or FM state. The most decisive factor to determine the state of the puck is speed. The lower the speed means the shape and color is more likely unchanged compare to a regular puck. On the other hand, the puck will become hazy like a shadow and hard to locate using image processing method conversely. Different methods regarding different states are discussed in the following sections.

Therefore, given that ice hockey puck in a broadcast video is constantly shapeshifting, by classifying the puck's moving state into two categories: controlled moving state and free moving state. Controlled moving (CM) state means the puck is being controlled by a player and usually has a similar moving pattern with the player. The trajectory under CM state is likely to be orderless and difficult to predict from previous locations. Another problem is when the puck is controlled by a player, it may suffer occlusion by hockey sticks every now and then, which shares the similar color, and sometimes the shape of the puck as it appears in a video frame.

As for free moving (FM) state, it is usually formed after a shooting action by a player. The puck is untouched and followed a constant velocity strategy during the FM state if the frame rate is relatively high. Players or referees on the court are not in the proximity for most of the cases, thus color segmentation or edge detection is likely to be a suitable method to separate the puck from the ice rink background, which possesses an obvious contrast of color. However, under FM state, the color of the puck changes paler and the shape lengthens due to the motion blur.

Preferably, it has been observed by the inventors that puck tracking under CM state may be performed through the use of "plain tracking" only. This is because the moving speed is related to the speed of the controlling player and obviously not fast enough to cause motion blur under frame rate in a real-time video. Most of the failure cases are caused by occlusion with other players, which usually lasts for several frames resulting in disappearance and reappearance at a location far away from predicted candidate region indicated by the previous trajectory. If the reappearance location lies outside of the correlation filter's search region (1.5 times larger than the bounding box of the puck), the tracker tends to drift to another similar object and fail to retrieve the puck again.

As mentioned above, the puck's moving speed under CM state is rather slow, which means that the shape of the puck presenting in the image will not change significantly, but only rotate or change its scale. In view of this assumption, to retrieve the puck after constant occlusion, a re-identification 400 approach as performed by the second output location process 314, as shown in FIG. 4A, composed by an ellipse detection technique 402 and a shape comparison method is proposed to find puck candidates 404 and select the right one in an adaptive enlarged search area controlled by the number of the puck's lost frames. First, following the previous locations of the puck, a connected component analysis is conducted within the search area and find contours share the similar shape and scale with the puck 400. Then an ellipse fitting approach 402, is adopted to find candidates with the shape of ellipse. For the next step of the re-ID phase 400, it is possible to carefully select the best match between candidates and the previous sample of the puck using shape similarity calculated by Hu moment invariants 404, the same as we those performed by the first object location process 310 as discussed above. Also, to tackle the problem of similar wrong candidates such as jersey numbers 408 or letters on the billboard 412, or other ellipsoid objects 410, 413, as shown in FIG. 4B, a segmentation module, as shown in FIG. 4C is arranged to segment a player and background into player and background segments to aid in locating the puck is also used.

In this example, the segmentation process operates by firstly establishing that a search area is in gray-level domain. A first bisect the area 416 using a normalized threshold of 0.5, then perform a closing operation to obtain the segmentation. An assessment is performed to determine if the candidate lies inside the segment by ray casting 418 algorithm S. D. Roth, "Ray casting for modeling solids," Computer graphics and image processing, vol. 18, no. 2, pp. 109-144, 1982, and using $I_{jn}$ to denote the candidate is within the segment or not 420.

Figure 4C:
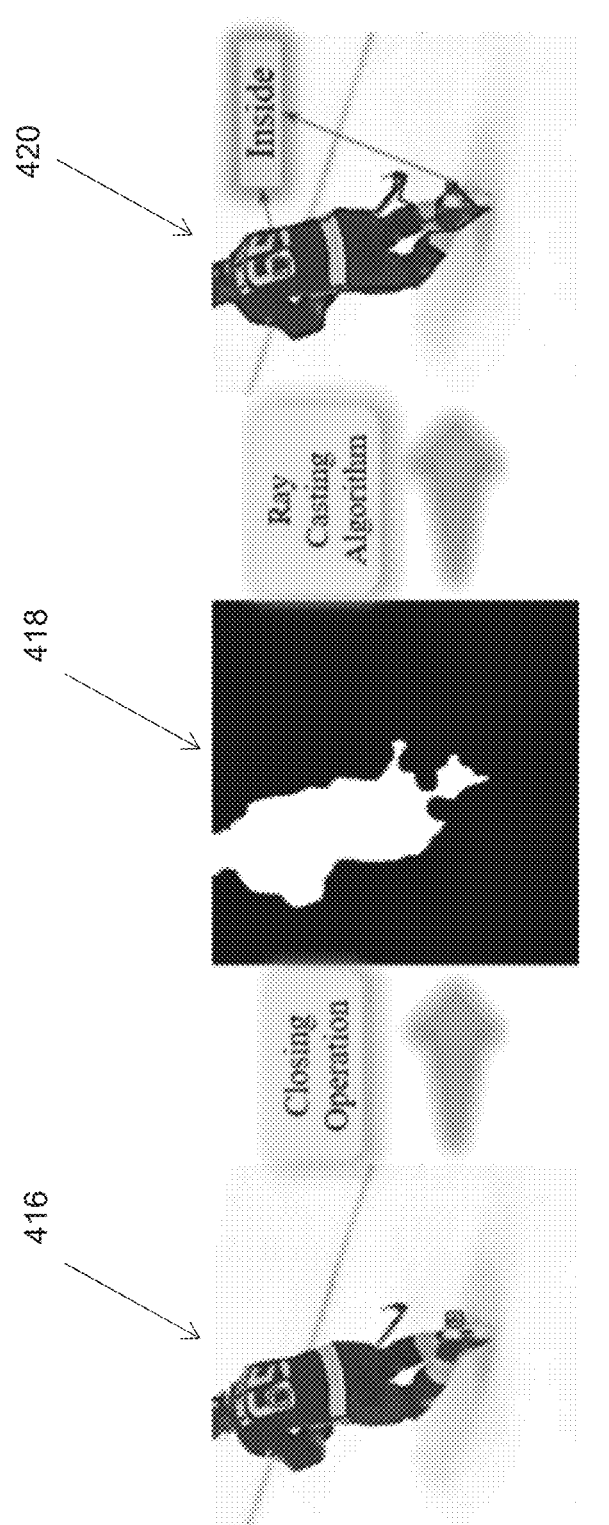
FIG. 4C is a data flow diagram illustrating an example of a segmentation process as part of the second object location process; and, FIG. 5 is a data flow diagram illustrating the second object location process when the puck is in a free moving (FM) state.
Figure 5:
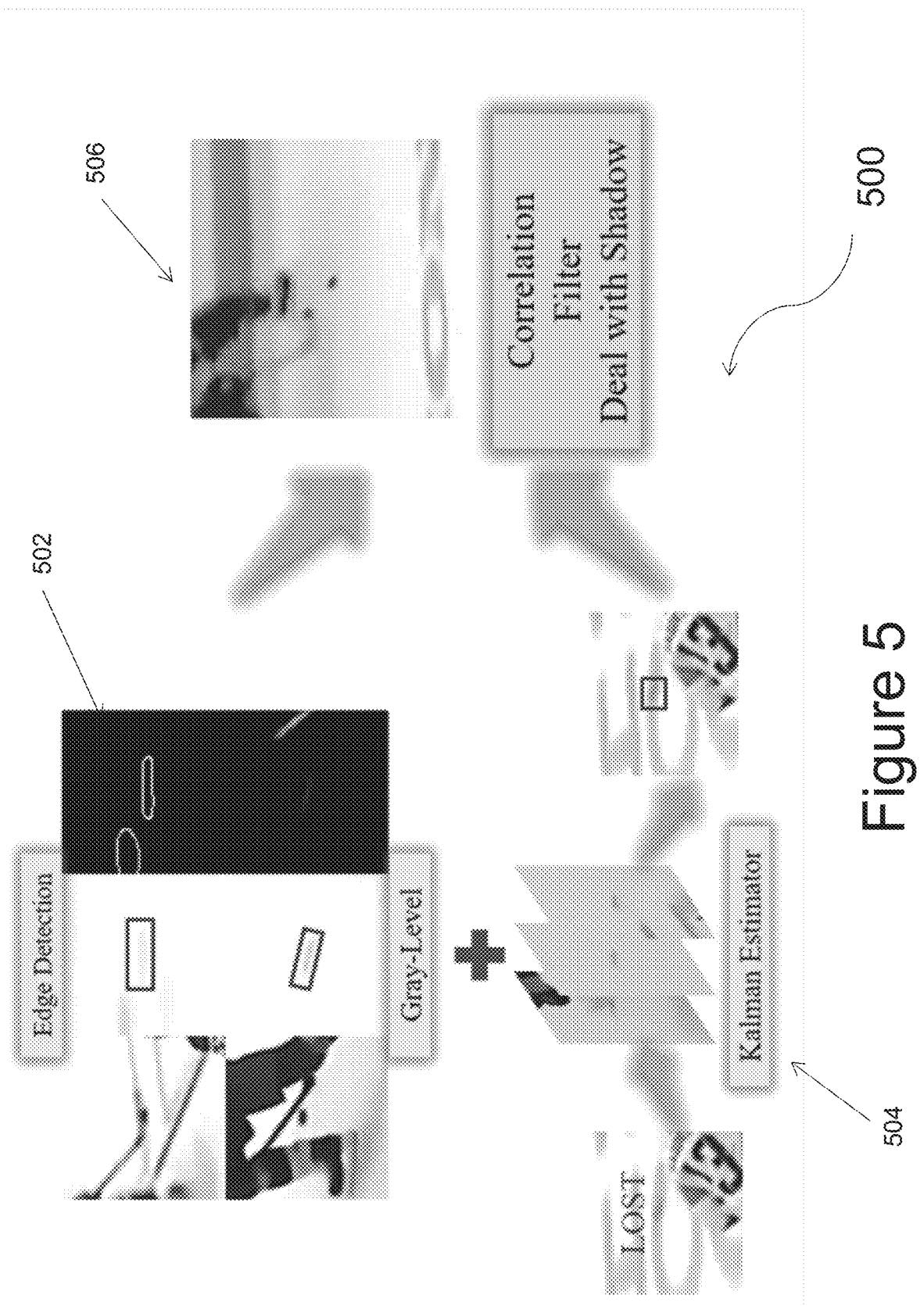

As shown in FIG. 4C, an example of the simple segmentation process is used to determine if the candidate lies inside a player 416. Two candidates, one is the jersey number and the other is the ice skate, are marked 416. Closing operation is used to find the segment of the player, later using ray casing algorithm 418 it is possible to determine if both candidates lie inside the player and save the results for further processing 420.

The overall CM Re-ID score $S_{CMreid}$ is calculated as follows:

$$S_{CMreid} = \frac{1}{1 + e^{(s_{ss} - \delta_{ss})\gamma_{ss}}} \times I_{in} \text{ where } I_{in} = \begin{cases} 0 & \text{if candidate is inside} \\ 1 & \text{if candidate is outside} \end{cases}$$

If the best match candidate lies outside of any players or billboard, and share the similar shape of the template within a threshold of $\delta_{ss}=0.4$, the re-identification score is near 1, then the candidate is attached to the previous tracking of the puck and fed to the tracker for continuous tracking.

As for free movement state (FM), the puck slides on the ice surface freely at a relatively high speed. Geometric shade of the puck is always displayed like a long stick on the image frame as shown in FIG. 5. Accompanied by the above appearance is the extremely indistinguishable gray-level from the ice surface. After conducting a statistical analysis on this particular circumstance, the best threshold to segment the puck from background is 0.95. However, this unreliable threshold, to some extent, causes constant confusion between the puck and the shadow of the player.

Preferably, to extract the puck with hazy color and gray-level, it is preferred to firstly detect the edge in the search area 502, then find the puck candidates using ellipse detection. Since the candidate may be easily influence by shadows, shape similarity is not able to provide a solid result. It is then possible to calculate the SSIM (Structural Similarity Index Measure) score between the candidate and a pre-cropped stick-like sample. Another cue is that the direction of the stick-like candidate shares a similar angle with the moving direction between the last known location of the puck and the candidate. Hence, calculate the angle similarity from both directions may eliminate wrong candidates easily.

Consider both the SSIM score and the angle distance, an example of a joint score of re-identification for FM state as follows, $$S_{FMreid} = \frac{1}{1 + e^{-(s_{SSIM} - \delta_{SSIM})\gamma_{SSIM}}} \times \frac{1}{1 + e^{(D_{angle} - \delta_{angle})\gamma_{angle}}}$$

where SSIM score is calculated as follows.

$$SSIM(x, y) = \frac{(2\mu_x\mu_y + c_1)(2\alpha_{xy} + c_2)}{(\mu_x^2 + \mu_y^2 + c_1)(\alpha_x^2 + \alpha_y^2 + c_2)}$$

Where $\mu$, $\alpha$ is the average and the variance of each image patch respectively. $c_1 = (k_1 L)^2$, $c_2 = (k_2 L)^2$ are variables to stabilize the division with weak denominator, and $k_1 = 0.01$, $k_2 = 0.03$ by default.

And angle distance is obtained by formula, $$D_{angle} = \left| \frac{A_{Candidate} - A_{Direction}}{A_{Direction}} \right|$$

When the candidate itself and the moving pattern share similar angles and the structure is alike with the template, the re-identification score $S_{FMreid}$ will be near 1. then it is possible to reclaim the stick-like candidate as the puck and continue tracking.

However, under the extreme circumstance of high speed, logos on the ground may be a serious interference. Considering the moving pattern of the puck is predictable and the trajectory under this moving state can be seen as linear, therefore it is preferable to also include a Kalman estimator 504 to help predict the location of the moving puck.

As shown in FIG. 6, the Re-identification phase dealing with free moving state (FM). To deal with extreme circumstances of fast-moving puck, edge detection 502 may be used with carefully selected gray-level threshold of 0.95 to find the hazy puck. As for logo-like and shadow interference, a Kalman estimator 504 and the existed correlation filter tracker is introduced to find the reasonable trajectory and the puck, respectively.

Given the observation that in most cases, if the puck is submerged in the shadow of a player, the puck is likely to be controlled by the very player within a short period of time. Thus, after 5-10 frames, for the puck to be stable and return to its natural geometric shape, the correlation filter 506 may be applied to find the puck with previous learnt feature in the enlarged search area provided by the Kalman estimator 504. Finally, these processes would complete the trajectory using linear interpolation method to finish the tracking procedure under FM state.

Once the CM and FM routines 316, 318 locates the pucks, the location of the puck in the frames to which it is located, may then be stored for further processing 320. The end result of the entire video stream being processed to locate the pucks could mean that the puck's spatial displacement during the game can be assessed for suitable user or game statistics, or it can be used to process the video for identify hi-lights or edits that could show the important aspects of the game. In camera control systems where the game is live, the puck's spatial displacement on the last video frame may allow the camera to be directed the last known location, or predicted location, so as to better control an automated camera operation to focus on the puck.

Embodiments of the system for tracking an object may be advantageous over other tracking system as the system includes a first object location process 310, a second objection location process 314 which is invoked when the first object location process 310 fails. Furthermore, the second objection location process 314 includes specific routines to locate the puck based on the physical characteristics of the puck as to whether it is in a Controlled Moving (CM) or Free Moving (FM) state. Therefore, embodiments of the system 300 may be advantageous as it is able to introduce a real-time approach solely based on image processing techniques to detect and track ice hockey pucks in broadcast video, incorporating a combination of contour fitting, correlation filter and motion estimation method. The contribution of this invention to tracking pucks is a least two folds.

The example embodiments of the system 300 may also presents a solution for tracking low texture ice hockey pucks using state-of-the-art correlation filter tracker, combined with weighted constrains by shape similarity and re-identification. Second, this system 300 presents a re-identification phase for tracking nearly invisible high speed pucks after shooting actions. This is the first approach to address this kind of extreme cases. Thorough experiments on the ice hockey game scenario and that the system 300 demonstrate accurate results in detecting and tracking ice hockey pucks through broadcast live streams.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for tracking an object comprising:
   an image input gateway arranged to receive a series of image frames from a stream of images, wherein the stream of images includes representations of the object being spatially displaced over the series of image frames;
   an object tracker arranged to process the series of image frames to track the object with a first object location process arranged to locate the object in the series of image frames; and, when upon the object is unable to be located by the first object location process in any of the image frames within the series of image frames, use a second object location process to locate the object in the image frames or subsequent image frames for tracking the object through the remaining series of image frames,
   wherein the second object location process includes a controlled movement tracking process and a free movement tracking process arranged to track the object, and
   wherein the controlled movement tracking process further includes a background segmentation process arranged to segment occlusion objects from the background to form occlusion object segment and a background segment, and where the one or more candidate objects are also determined to be within the occlusion objects segment or background segment, and if the one or more candidate objects are inside the occlusion objects segment, then the one or more candidate objects are deemed not to be the object.

2. A system for tracking an object in accordance with claim 1, wherein the first object location process locates the object in the series of image frames by applying a filter to each of the image frames, wherein the filter is initialized based on a confirmed image portion of the object.

3. A system for tracking an object in accordance with claim 2, wherein the confirmed image portion of the object is retrieved from an initial image frame of the series of image frames, representative of a known position of the object before the object is spatially displaced.

4. A system for tracking an object in accordance with claim 3, wherein the first object location process further includes a shape comparator arranged to compare at least one candidate object image portion selected by the filter, with a template of an object arranged to represent a shape of the object.

5. A system for tracking an object in accordance with claim 4, wherein the template of the object is determined by the confirmed image portion of the object.

6. A system for tracking an object in accordance with claim 5, wherein the filter includes a correlation filter.

7. A system for tracking an object in accordance with claim 6, wherein the correlation filter and the shape comparator each produces a result score, the result score is processed to determine if the first object location process is able to locate the object in the series of image frames.

8. A system for tracking an object in accordance with claim 1 wherein the controlled movement tracking process includes:
   a shape detection routine arranged to performing a shape detection to identify if one or more candidate object image portions within the image frames are of a similar shape to the object; and
   an object comparator arranged to compare each of the templates with the one or more candidate objects to identify the object from the one or more candidate object image portions.

9. A system for tracking an object in accordance with claim 8, wherein the comparator is further arranged to use a Hu Moment method.

10. A system for tracking an object in accordance with claim 9, wherein the background segmentation process includes a ray casting routine arranged to segment the occlusion objects from the background.

11. A system for tracking an object in accordance with claim 10, wherein the free movement tracking process includes:
   an edge detection process arranged to locate the object against the background; and,
   a filter routine arranged to predict a trajectory of the object.

12. A system for tracking an object in accordance with claim 11, wherein the filter routine uses a Kalman estimator.

13. A system for tracking an object in accordance with claim 12, wherein the movement tracking process further includes using a correlation filter to locate the object.

14. A method for tracking an object comprising the steps of:
   receiving a series of image frames from a stream of images, wherein the stream of images includes representations of the object being spatially displaced over the series of image frames;
   processing the series of image frames to track the object with a first object location process arranged to locate the object in the series of image frames; and, when upon the object is unable to be located by the first object location process in any of the image frames within the series of image frames, use a second object location process to locate the object in the image frames or subsequent image frames for tracking the object through the remaining series of image frames,
   wherein the second object location process includes a controlled movement tracking process and a free movement tracking process arranged to track the object, and
   wherein the controlled movement tracking process further includes a background segmentation process arranged to segment occlusion objects from the background to form occlusion object segment and a background segment, and where the one or more candidate objects are also determined to be within the occlusion objects segment or background segment, and if the one or more candidate objects are inside the occlusion objects segment, then the one or more candidate objects are deemed not to be the object.

15. A method for tracking an object in accordance with claim 14, wherein the controlled movement tracking process includes:
   a shape detection routine arranged to performing a shape detection to identify if one or more candidate object image portions within the image frames are of a similar shape to the object; and
   an object comparator arranged to compare each of the templates with the one or more candidate objects to identify the object from the one or more candidate object image portions.

16. A method for tracking an object in accordance with claim 15, wherein the comparator is further arranged to use a Hu Moment method.

17. A method for tracking an object in accordance with claim 16, wherein the free movement tracking process includes:
   an edge detection process arranged to locate the object against the background; and,
   a filter routine arranged to predict a trajectory of the object.

* * * * *